(12) United States Patent
Lee

(10) Patent No.: US 9,898,597 B2
(45) Date of Patent: *Feb. 20, 2018

(54) SECURE DATA ENTRY

(71) Applicant: SOFTLAYER TECHNOLOGIES, INC., Dallas, TX (US)

(72) Inventor: Chong Lee, Allen, TX (US)

(73) Assignee: Softlayer Technologies, Inc., Dallas, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/396,928

(22) Filed: Jan. 3, 2017

(65) Prior Publication Data

US 2017/0116406 A1 Apr. 27, 2017

Related U.S. Application Data

(63) Continuation of application No. 13/093,141, filed on Apr. 25, 2011.

(51) Int. Cl.
*G09G 1/00* (2006.01)
*G06F 21/36* (2013.01)
*G06F 3/0488* (2013.01)

(52) U.S. Cl.
CPC .......... *G06F 21/36* (2013.01); *G06F 3/04886* (2013.01)

(58) Field of Classification Search
CPC . G06F 1/00; G06F 3/016; G06F 3/017; G06F 3/018; G06F 3/0482
See application file for complete search history.

(56) References Cited

U.S. PATENT DOCUMENTS

| | | | |
|---|---|---|---|
| 6,209,104 B1 * | 3/2001 | Jalili | G06F 21/36 340/5.8 |
| 6,549,194 B1 | 4/2003 | McIntyre | |

(Continued)

FOREIGN PATENT DOCUMENTS

| | | |
|---|---|---|
| CN | 101027630 | 8/2007 |
| CN | 101183412 | 5/2008 |

(Continued)

OTHER PUBLICATIONS

Notice of Allowance (dated Oct. 7, 2016) for U.S. Appl. No. 13/093,141, filed Apr. 25, 2011.

(Continued)

*Primary Examiner* — Michael Faragalla
(74) *Attorney, Agent, or Firm* — Schmeiser, Olsen & Watts, LLP

(57) ABSTRACT

A method and associated computing device, A first arrangement of numeric characters 0-9 is displayed, on a touch screen of the computing device, for an entry of a confidential sequence of numeric characters by a user during display of the first arrangement of the numeric characters 0-9 in ten respective regions of the touch screen. Each region includes (i) a unique numeric character and (ii) a graphical design that does not include the unique numeric character. The graphical design in each region is a different graphical design in each region. Each region has a closed exterior boundary and is totally filled with the graphical design consisting of a background pattern or no pattern. A graphical characteristic is instantiated differently for each numeric character displayed in the first arrangement. User touches are received on the displayed first arrangement of the confidential sequence of numeric characters to authenticate or authorize the user.

18 Claims, 3 Drawing Sheets

(56) References Cited

U.S. PATENT DOCUMENTS

| | | | |
|---|---|---|---|
| 6,925,169 | B2 | 8/2005 | Habu |
| 7,333,602 | B2 | 2/2008 | Habu |
| 7,800,592 | B2 | 9/2010 | Kerr et al. |
| 8,334,845 | B2 | 12/2012 | Liu |
| 2004/0030933 | A1 | 2/2004 | Park |
| 2004/0230843 | A1* | 11/2004 | Jansen .................... G06F 21/36 726/7 |
| 2006/0005039 | A1 | 1/2006 | Hsieh et al. |
| 2006/0053301 | A1 | 3/2006 | Shin |
| 2009/0213132 | A1 | 8/2009 | Kargman |
| 2010/0020035 | A1 | 1/2010 | Ryu et al. |
| 2010/0259561 | A1 | 10/2010 | Forutanpour et al. |
| 2012/0268393 | A1 | 10/2012 | Lee |
| 2012/0326984 | A1* | 12/2012 | Ghassabian ........... G06F 3/0236 345/168 |

FOREIGN PATENT DOCUMENTS

| | | |
|---|---|---|
| JP | H0981522 | 3/1997 |
| JP | 2008004107 | 1/2008 |
| JP | 2008072262 | 3/2008 |
| JP | 2009211533 | 9/2009 |
| JP | 2012068752 | 4/2012 |
| WO | WO2006020304 | 2/2006 |

OTHER PUBLICATIONS

Amendment (dated Aug. 25, 2016) for U.S. Appl. No. 13/093,141, filed Apr. 25, 2011.
Office Action (dated May 25, 2016) for U.S. Appl. No. 13/093,141, filed Apr. 25, 2011.
RCE and PA (dated Oct. 6, 2015) for U.S. Appl. No. 13/093,141, filed Apr. 25, 2011.
Advisory Action (dated Sep. 25, 2015) for U.S. Appl. No. 13/093,141, filed Apr. 25, 2011.
Final Amendment (dated Sep. 8, 2015) for U.S. Appl. No. 13/093,141, filed Apr. 25, 2011.
Final Office Action (dated Jul. 6, 2015) for U.S. Appl. No. 13/093,141, filed Apr. 25, 2011.
Amendment (dated Mar. 2, 2015) for U.S. Appl. No. 13/093,141, filed Apr. 25, 2011.
Office Action (dated Dec. 4, 2014) for U.S. Appl. No. 13/093,141, filed Apr. 25, 2011.
RCE and PA (dated Oct. 2, 2014) for U.S. Appl. No. 13/093,141, filed Apr. 25, 2011.
Advisory Action (dated Sep. 25, 2014) for U.S. Appl. No. 13/093,141, filed Apr. 25, 2011.
Final Office Action (dated Jul. 3, 2014) for U.S. Appl. No. 13/093,141, filed Apr. 25, 2011.
Final Amendment (dated Aug. 29, 2014) for U.S. Appl. No. 13/093,141, filed Apr. 25, 2011.
Office Action (dated Dec. 16, 2013) for U.S. Appl. No. 13/093,141, filed Apr. 25, 2011.
Amendment (dated Mar. 17, 2014) for U.S. Appl. No. 13/093,141, filed Apr. 25, 2011.
RCE with PA (dated Nov. 12, 2013) for U.S. Appl. No. 13/093,141, filed Apr. 25, 2011.
Final Office Action (dated Jun. 21, 2013) for U.S. Appl. No. 13/093,141, filed Apr. 25, 2011.
Final Amendment (dated Oct. 10, 2013) for U.S. Appl. No. 13/093,141, filed Apr. 25, 2011.
Office Action (dated May 9, 2013) for U.S. Appl. No. 13/093,141, filed Apr. 25, 2011.
Amendment (dated Jun. 6, 2013) for U.S. Appl. No. 13/093,141, filed Apr. 25, 2011.

* cited by examiner

SECURE DATA ENTRY

This application is a continuation application claiming priority to Ser. No. 13/093,141, filed Apr. 25, 2011, now U.S. Pat. No. 9,576,122, issued Feb. 21,2017.

FIELD

The present disclosure relates to system and method for secure data entry on a touch-sensitive screen.

BACKGROUND

Touch-sensitive screens or touch screens are commonly used in a myriad of devices as a user interface, such as smartphones, personal digital assistants, tablet computers, kiosks, ATM terminals, point-of-sale terminals, and other computing devices. A touch screen enables the coupling of data entry with the display so that the user may enter data and make selections by directly touching displayed elements on the screen. The use of the touch screen is especially popular with mobile devices because of the elimination of the keyboard to yield more real estate to a larger display screen.

The entry of security data such as passwords and PIN data is often required to gain access to certain resources such as websites, financial accounts, shopping accounts, other protected data, or the use of the device itself. When a keypad is displayed on a touch screen to enter such security data, the user may unwittingly yield a fingerprint pattern or finger movement pattern that may be used to decode the security data by malicious criminals. Accordingly, a need arises for a solution to greatly minimize such unauthorized access to confidential and protected data and resources.

SUMMARY

An electronic device and method have been envisioned to increase the security of data entry on a touch-sensitive screen.

An electronic device comprises a CPU, and a touch-sensitive screen operable to display a plurality of keys. Each of the plurality of keys are associated with and exhibit a predetermined value, where the keys are arranged so that the predetermined values of the keys are displayed in a random manner. The predetermined values of the plurality of keys have different predetermined display characteristics associated therewith so that the plurality of keys have varied appearances.

An electronic device comprises a CPU, and a touch-sensitive screen operable to display a plurality of sequential values arranged in a randomized manner, where the displayed sequential values are operable to be displaced by a user's input to at least one predetermined location on the screen to effect data entry.

A method for secured data entry on an electronic device comprises displaying a plurality of keys on a touch-sensitive screen, wherein the plurality of keys are displayed such that the keys each shows and is associated with a predetermined value, the keys are arranged so that the predetermined values of the keys are displayed in a random manner, and the keys are each displayed to exhibit a predetermined display characteristic associated with the predetermined value of each key. The method further includes receiving a user input via the plurality of displayed keys.

DETAILED DESCRIPTION

Figure 1:
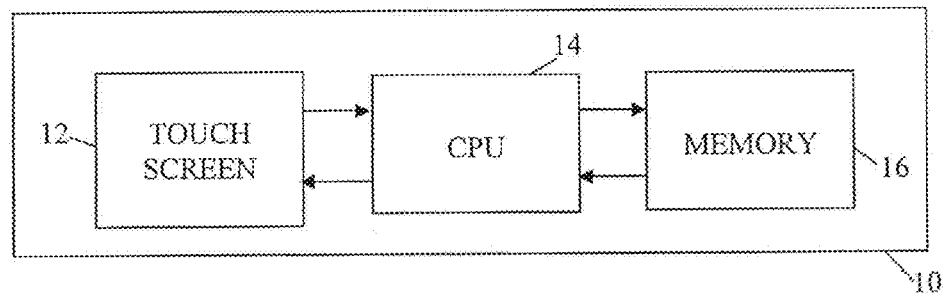
FIG. 1 is a simplified block diagram of an exemplary embodiment of an electronic computing device.

FIG. 1 is a simplified block diagram of an exemplary embodiment of an electronic device 10. The electronic device 10 may not be any device or terminal employing a touch-sensitive display screen 12, such as smartphones, personal digital assistants, personal computers, laptop computers, notebook computers, tablet computers, kiosks, ATM terminals, point-of-sale terminals, and other computing devices. Such electronic devices 10 include a CPU (central processing unit) 14 for executing software that performs processing, computing, decision, and communicating functions. A memory 16 in the form of RAM (random access memory), ROM (read-only memory), hard drive, mod/or any suitable data storage device is used to store information needed for later retrieval and computation. The electronic device 10 may include other peripheral devices as desired. The term "computer-readable storage device" does not mean a signal propagation medium such as a copper transmission cable, an optical transmission fiber, or a wireless transmission media.

The electronic device 10 may require a security code such as a password or PIN to operate and/or access information, accounts, or other protected resources. For example, a smartphone, personal digital assistant, or tablet computer may require a password to unlock the device to enable use. As another example, an ATM may require the correct entry of a PIN in order for the user to access a bank account.

Figure 2:
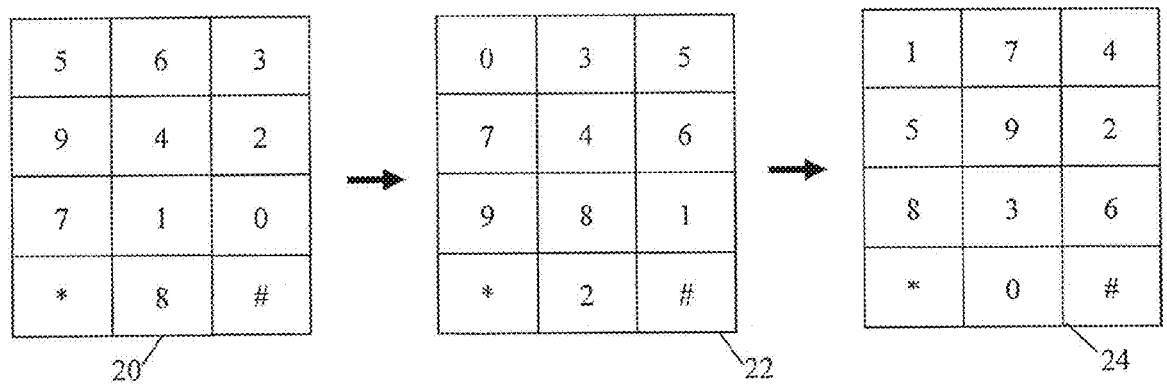
FIG. 2 is a diagram representation of a touch screen displaying exemplary successively random keypads for receiving user input of security data.

FIG. 2 is a diagram representation of a touch screen displaying exemplary successively randomly arranged keys in a keyboard format for receiving user input of security data. The random arrangement referenced by numerals 20-24 represent three separate and successive times in which the user is requested to enter a security code. As shown in FIG. 2, the keys exhibit and we are associated with values that are scrambled each time the user accesses the protected resource. Accordingly, because the positions of the security code digits are different each time, the user's finger movements and the fingerprints left on the touch screen are also different each time. These random variations may thwart malicious attempts by criminals to decode the finger movements and/or fingerprints to acquire the security code.

However, studies show that the use of a random keypad is often confusing to users and causes mis-entry of the security data.

Figure 3:
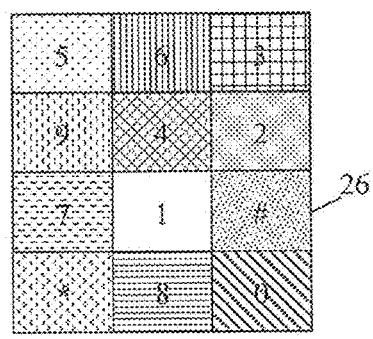
FIG. 3 is s a diagram representation of a touch screen displaying an exemplary random keypad using various background patterns for the keys.

FIG. 3 is a diagram representation of a touch screen displaying an exemplary random keypad 26 using various different background patterns for the keys. Each key is associated with a particular value, such as a numerical or alphanumerical value, which is in turn associated with a particular background pattern. Therefore as shown in the example in FIG. 3, the numerical value "1" is always displayed with a pattern-less background although its location in the keypad varies each time. Similarly in the example, the numerical value "3" is always displayed with a grid background pattern, the numerical value "7" is always displayed with a series of horizontal dashed lines, the numerical value "2" is always displayed with a dotted background, and so on. The background pattern in the region containing the numerical value "5" is a pattern of dots characterized by a spatially uniform dot density throughout the region, the background pattern in the regions containing the numerical value "6" and "8" is a pattern of continuous solid lines spaced uniformly apart from each other and characterized by an orientation pattern of the solid lines, background pattern in the region containing the numerical values "7" and "9" is a pattern of broken lines spaced uniformly apart from each other with gaps of constant gap size between successive segments of each broken line and characterized by an orientation pattern of the broken lines. When displayed in this manner, although the positions of the numerical values in the same background patterns over time, the confusion that leads to mis-entry can be greatly reduced.

In a similar manner, variations in other display characteristics such as the background color and/or the foreground color of the keys can also be used to decrease the amount of user confusion. For example, the numerical value "5" is always displayed with a red background color, the numerical value "7" is always displayed with a yellow background color, the numerical value "6" is always displayed with a blue background color, and so on. In another example varying the foreground colors, the numerical value "2" is always displayed with a red foreground color, the numerical value "6" is always displayed with a blue foreground color, the numerical value "8" is always displayed with a green foreground color, and so on. Color combinations of foreground and background colors can also be used effectively in the same manner.

Figure 4:
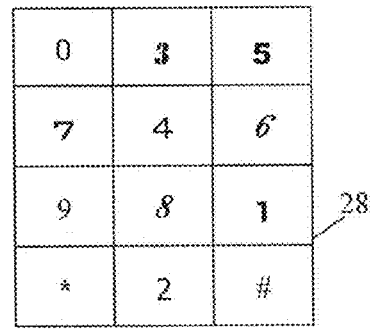
FIG. 4 is a diagram representation of a touch screen displaying an exemplary random keypad using various fonts for the keys.

FIG. 4 is a diagram representation of a touch screen displaying an exemplary random keypad 28 using various fonts for the keys, As shown in FIG. 4, each key is associated with a particular value, such as a numerical or alphanumerical value, which is in turn associated with a particular font type to further differentiate the keys and reduce confusion.

Figure 5:
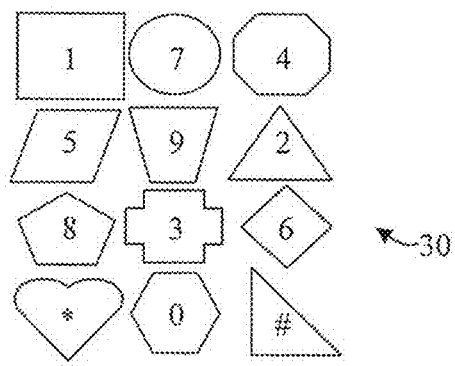
FIG. 5 is a diagram representation of a touch screen displaying an exemplary random keypad using various shapes for the keys.

FIG. 5 is a diagram representation of a touch screen displaying an exemplary random keypad 30 using various shapes for the keys. In another embodiment shown in FIG. 5, each key is associated with a particular value, such as a numerical or alphanumerical value, which is in turn associated with a particular shape to further differentiate the keys and reduce user confusion that lead to erroneous entry of security data. Accordingly as shown in FIG. 5, the numerical value "1" is always displayed with a rectangle-shaped key, the numerical value "2" is always displayed with a triangle-shaped key, the numerical value "3" is always displayed with the geometric-shaped key of shape depicted in FIG. 5, the numerical value "4" is always displayed with an octagon-shaped key, the numerical value "5" is always displayed with a rhombus-shaped key, the numerical value "6" is always displayed with a rhombus-shaped key approximating a square-shaped key, the numerical value "7" is always displayed with a circular-shaped key, the numerical value "8" is always displayed with a pentagon-shaped key, the numerical value "9" is always displaced with a trapezoid-shaped key, the numerical value "0" is always displayed with a hexagon-shaped key, and so on.

The various display characteristics including the foreground color, background color, background pattern, font, and shape may be used in combinations to distinguish the appearance of the keys from one another.

Figure 6:
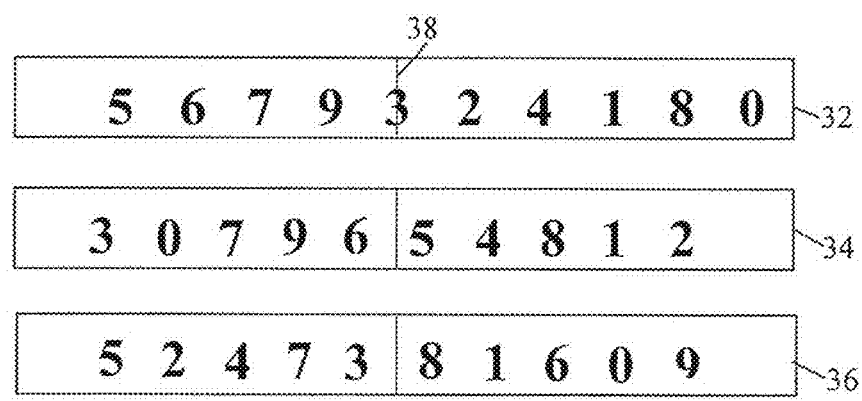
FIG. 6 is a diagram representation of a touch screen displaying an exemplary random keypad using three slidable key arrays.

FIG. 6 is a diagram representation of a touch screen displaying an exemplary random keypad using three slidable key arrays 32-36. In the embodiment shown in FIG. 6, each array includes numerical values arranged in a random manner, and the numerical values in the three arrays are arranged in different sequences. Each of the arrays functions as a virtual rotary dial that receives the user's fingers movement along the axis of the array to effect a displacement of the displayed numerical values. For example, the user's finger movement on the array to the right would cause the displayed numerals to be shifted to the right, and the finger movement on the array to the left would cause the displayed numerals to be shifted to the left. A data entry may thus be achieved by placing or displacing the numerals so that the desired digit is moved to a predetermined location in the array, such as for example, the center point of the arrays marked by the vertical marks 38. Thus, for the example shown in FIG. 6, the three arrays may be used to receive the user's input of a three-digit security code.

Figure 7:
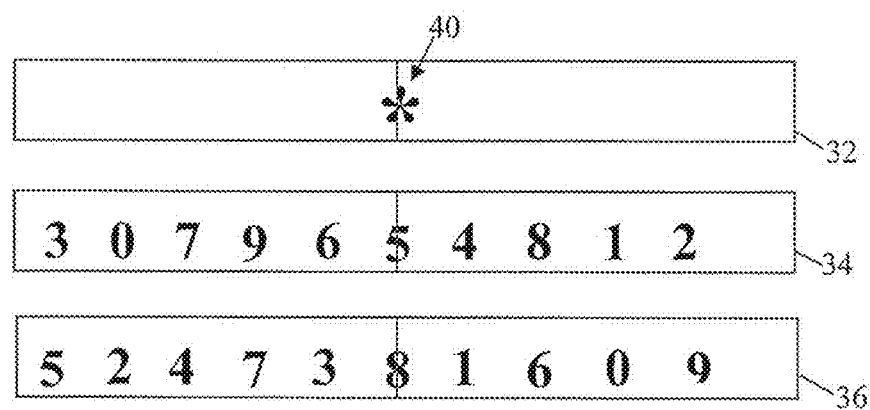
FIG. 7 is a diagram representation of a touch screen displaying an exemplary random keypad showing one of the three slidable key arrays in a locked state.

FIG. 7 is a diagram representation of a touch screen displaying an exemplary random keypad showing one of the three slidable key arrays 32-36 in a locked state. As shown in FIG. 7, the arrays 32 displays a predetermined character, such as an asterisk, "*", that indicate the entry for the first digit of the security data has been received and locked in place. In this way, inadvertent brushing on the touch screen would not alter the first digit that has already been entered correctly. Once locked, the user may still change the entered digit by some other predetermined entry, such as by tapping on the displayed asterisk, for example.

Figure 8:
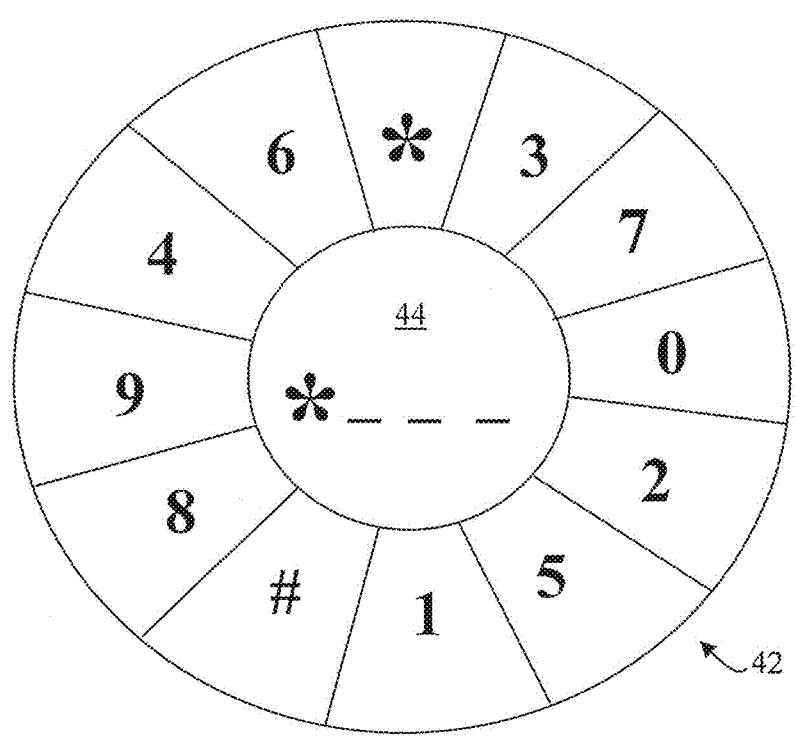
FIG. 8 is a diagram representation of a touch screen displaying exemplary randomly arranged keys in a wheel format.

FIG. 8 is a diagram representation of a touch screen displaying exemplary randomly arranged keys in a wheel format 42. Similar to the array format in FIGS. 6 and 7, data entry on the wheel may be performed by "sliding" the keys bearing the numerical values. For example, the user's finger movement on a selected key toward the center 44 of the wheel 42 would cause the entry of that numeral displayed on the displaced key. Asterisks or another suitable symbol may be displayed to indicate how many digits have been entered. As shown in the example of FIG. 8, one digit of the security code has been entered and there are three remaining digits to be entered.

As described above, a security code needed to unlock a device or gain access to a resource may be entered on a touch screen in a more secure way, without revealing telltale finger movements or fingerprints that may be used to determine the security code.

The features of the present invention which are believed novel are set forth below with particularity in the appended claims. However, modifications, variations, and changes to the exemplary embodiments described above will be apparent to those skilled in the art, and the electronic device and secure data entry method thus encompass such modifications, variations, and changes and are not limited to the specific embodiments described herein.

The invention claimed is:

1. A method, said method comprising:
   displaying, on a touch screen of a computing device, a
      first arrangement of numeric characters 0-9 for an entry of a confidential sequence of numeric characters by a user during display of the first arrangement of the numeric characters 0-9 in ten respective two-dimensional regions of the touch screen, wherein each region comprises (i) a unique numeric character of the numeric characters 0-9 and (ii) a graphical design that does not include the unique numeric character, wherein the graphical design in each region is a different graphical design in each region, wherein each region has a closed exterior boundary and is totally filled with the graphical design consisting of a background pattern or no pattern, wherein the background pattern in one or more regions of the ten regions is independently selected from the group consisting of a pattern of dots characterized by a spatially uniform distribution of dots throughout the region, and a pattern of continuous solid lines spaced uniformly apart from each other and characterized by an orientation pattern of the solid lines, and a pattern of broken lines spaced uniformly apart from each other with gaps of constant gap size between successive segments of each broken line and characterized by an orientation pattern of the broken lines, wherein a portion of the graphical design in each region surrounds the entire numeric character in each region and encompasses an area disposed between the numeric character and the exterior boundary of each region, wherein a graphical characteristic is instantiated differently for each numeric character displayed in the first arrangement, and wherein the graphical characteristic instantiated differently for each numeric character is the graphical design in each region being said different graphical design in each region; and receiving user touches on the displayed first arrangement of the confidential sequence of numeric characters to authenticate or authorize the user, wherein the different graphical design in the ten regions comprise: (i) in a first region of the ten regions, a first graphical design having a series of parallel lines oriented vertically, (ii) in a second region of the ten regions, a second graphical design having a series of parallel lines oriented horizontally, and (iii) in a third region of the ten regions, a third series of parallel lines oriented diagonally.

2. The method of claim 1, said method further comprising:
the computing device displaying a second, different arrangement of the ten numeric characters 0-9 for a next entry of the confidential sequence of numeric characters by the user during display of the second arrangement of the numeric characters 0-9 in ten respective regions, wherein the graphical characteristic is instantiated differently for each numeric character displayed in the second arrangement, and wherein each numeric character has a same instantiation of the graphical characteristic in the first and second arrangements; and the computing device receiving user touches on the displayed second arrangement of the confidential sequence of numeric characters to authenticate or authorize the user.

3. The method of claim 1, wherein one region of the ten regions comprises a background pattern characterized by said pattern of dots.

4. The method of claim 1, wherein one region of the ten regions comprises a background pattern characterized by said pattern of continuous solid lines.

5. The method of claim 1, wherein one region of the ten regions comprises a background pattern characterized by said pattern of broken lines.

6. The method of claim 1, wherein the confidential sequence of numeric characters is a password or PIN.

7. The method of claim 2, wherein locations on the touch screen of the confidential sequence of numeric characters relative to the second arrangement of numeric characters 0-9 differs from locations on the touch screen of at least some of the confidential sequence of numeric characters relative to the first arrangement of numeric characters 0-9.

8. The method of claim 1, wherein each region has a different shape characterized by the exterior boundary of each region having a different shape.

9. A computer program product, comprising a computer readable storage device having computer readable program instructions stored therein, said program instructions being executable by a computer processor of a computing device to implement a method, said method comprising:
displaying, on a touch screen of the computing device, a first arrangement of numeric characters 0-9 for an entry of a confidential sequence of numeric characters by a user during display of the first arrangement of the numeric characters 0-9 in ten respective two-dimensional regions of the touch screen, wherein each region comprises (i) a unique numeric character of the numeric characters 0-9 and (ii) a graphical design that does not include the unique numeric character wherein the graphical design in each region is a different graphical design in each region, wherein each region has a closed exterior boundary and is totally filled with the graphical design consisting of a background pattern or no pattern, wherein the background pattern in one or more regions of the ten regions is independently selected from the group consisting of a pattern of dots characterized by a spatially uniform distribution of dots throughout the region, and a pattern of continuous solid lines spaced uniformly apart from each other and characterized by an orientation pattern of the solid fines, and a pattern of broken lines spaced uniformly apart from each other with gaps of constant gap size between successive segments of each broken line and characterized by an orientation pattern of the broken lines, wherein a portion of the graphical design in each region surrounds the entire numeric character in each region and encompasses an area disposed between the numeric character and the exterior boundary of each region, wherein a graphical characteristic is instantiated differently for each numeric character displayed in the first arrangement, and wherein the graphical characteristic instantiated differently for each numeric character is the graphical design in each region being said different graphical design in each region; and receiving user touches on the displayed first arrangement of the confidential sequence of numeric characters to authenticate or authorize the user, wherein the different graphical design in the ten regions comprise: (i) in a first region of the ten regions, a first graphical design having a series of parallel lines oriented vertically, (ii) in a second region of the ten regions, a second graphical design having a series of parallel lines oriented horizontally, and (iii) in a third region of the ten regions, a third series of parallel lines oriented diagonally.

10. The computer program product of claim 9, said method further comprising:

the computing device displaying a second, different arrangement of the ten numeric characters 0-9 for a next entry of the confidential sequence of numeric characters by the user during display of the second arrangement of the numeric characters 0-9 in ten respective regions, wherein the graphical characteristic is instantiated differently for each numeric character displayed in the second arrangement, and wherein each numeric character has a same instantiation of the graphical characteristic in the first and second arrangements; and the computing device receiving user touches on the displayed second arrangement of the confidential sequence of numeric characters to authenticate or authorize the user.

11. The computer program product of claim 9, wherein one region of the ten regions comprises a background pattern characterized by said pattern of dots.

12. The computer program product of claim 9, wherein one region of the ten regions comprises a background pattern characterized by said pattern of continuous solid lines.

13. The computer program product of claim 9, wherein one region of the ten regions comprises a background pattern characterized by said pattern of broken lines.

14. A computing device, comprising a processor, a memory, and a computer readable storage device, said storage device containing program instructions executable by the processor via the memory to implement a method, said method comprising:

displaying, on a touch screen of the computing device, a first arrangement of numeric characters 0-9 for an entry of a confidential sequence of numeric characters by a user during display of the first arrangement of the numeric characters 0-9 in ten respective two-dimensional regions of the touch screen, wherein each region comprises (i) a unique numeric character of the numeric characters 0-9 and (ii) a graphical design that does not include the unique numeric character, wherein the graphical design in each region is a different graphical design in each region, wherein each region has a closed exterior boundary and is totally filled with the graphical design consisting of a background pattern or no pattern, wherein the background pattern in one or more regions of the ten regions is independently selected from the group consisting of a pattern of dots characterized by a spatially uniform distribution of dots throughout the region, and a pattern of continuous solid lines spaced uniformly apart from each other and characterized by an orientation pattern of the solid lines, and a pattern of broken lines spaced uniformly apart from each other with gaps of constant gap size between successive segments of each broken line and characterized by an orientation pattern of the broken lines, wherein a portion of the graphical design in each region surrounds the entire numeric character in each region and encompasses an area disposed between the numeric character and the exterior boundary of each region, wherein a graphical characteristic is instantiated differently for each numeric character displayed in the first arrangement, and wherein the graphical characteristic instantiated differently for each numeric character is the graphical design in each region being said different graphical design in each region; and receiving user touches on the displayed first arrangement of the confidential sequence of numeric characters to authenticate or authorize the user, wherein the different graphical design in the ten regions comprise: a shape of a first region of the ten regions being a pentagon. a shape of a second region of the ten regions being a hexagon, and a shape of a third region of the ten regions being an octagon.

15. The computing device of claim 14, said method further comprising:

the computing device displaying a second, different arrangement of the ten numeric characters 0-9 for a next entry of the confidential sequence of numeric characters by the user during display of the second arrangement of the numeric characters 0-9 in ten respective regions, wherein the graphical characteristic is instantiated differently for each numeric character displayed in the second arrangement, and wherein each numeric character has a same instantiation of the graphical characteristic in the first and second arrangements; and the computing device receiving user touches on the displayed second arrangement of the confidential sequence of numeric characters to authenticate or authorize the user.

16. The computing device of claim 14, wherein one region of the ten regions comprises a background pattern characterized by said pattern of dots.

17. The computing device of claim 14, wherein one region of the ten regions comprises a background pattern characterized by said pattern of continuous solid lines.

18. The computing device of claim 14, wherein one region of the ten regions comprises a background pattern characterized by said pattern of broken lines.

* * * * *